Figure 1:
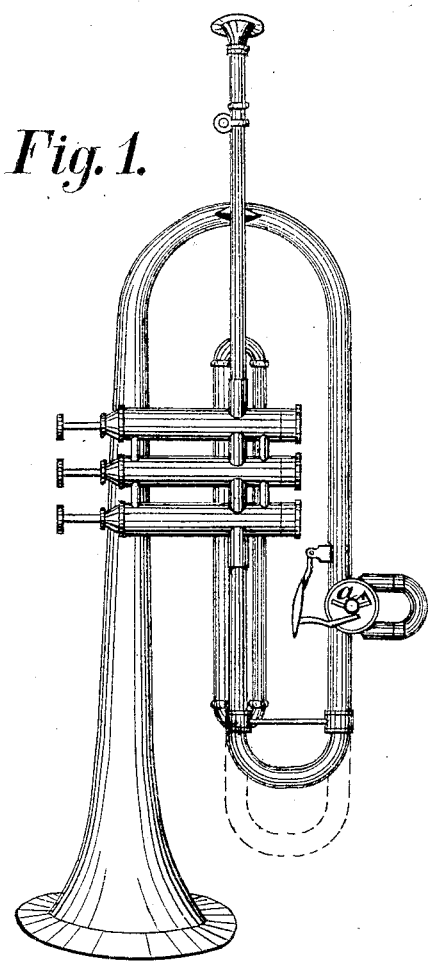

3 Sheets--Sheet 1.

ROBERT H. GATES.

Improvement in Military Band-Instruments.

No. 127,591. Patented June 4, 1872.

Witnesses:

Inventor:

Robert H. Gates,
by Johnson, Klaucke &Co
his attorneys.

ROBERT H. GATES.
Improvement in Military Band-Instruments.
No. 127,591.  Patented June 4, 1872.

3 Sheets--Sheet 2.

3 Sheets--Sheet 3.
ROBERT H. GATES.
Improvement in Military Band-Instruments.
No. 127,591. Patented June 4, 1872.
Fig. 3.
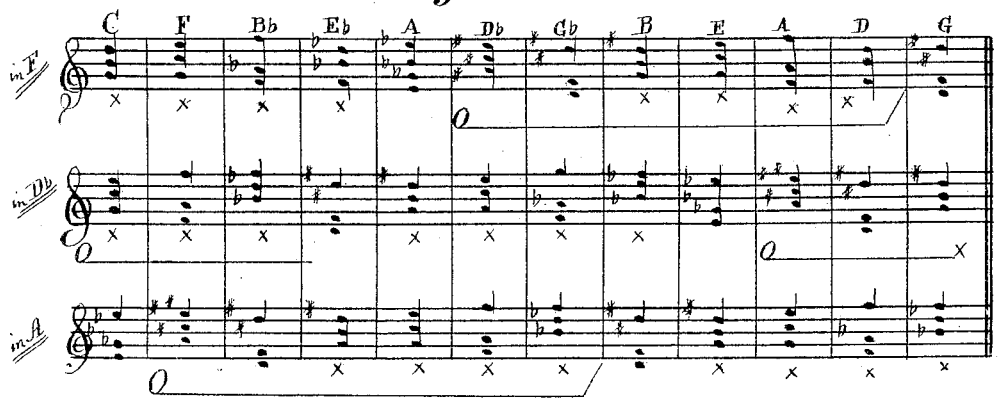
Witnesses:
J. W. Wagner
Parker H. Sweet, Jr.
Inventor:
Robert H. Gates
by
Johnson, Klaucke & Co.
his attorneys

UNITED STATES PATENT OFFICE.

ROBERT H. GATES, OF LANCASTER, OHIO.

IMPROVEMENT IN MILITARY-BAND INSTRUMENTS.

Specification forming part of Letters Patent No. 127,591, dated June 4, 1872.

*To all whom it may concern:*

Be it known that I, ROBERT H. GATES, of Lancaster, in the county of Fairfield and State of Ohio, have invented certain new and useful Improvements in Metallic Musical Valved Instruments, of which the following is a specification:

My invention relates to metallic musical wind instruments having valves such as are in common use; and my said invention consists in the construction of a set of valved musical instruments—seven in number—to be tuned or pitched at intervals of a major third apart, and to comprise two octaves, whereby the musician will be able to use either of the twelve semitones of the chromatic scale as a key-note, and still play in the favorite keys of the instrument—namely, their key-notes, fourths, fifths, and flat sevenths. My invention further consists of a combining valve applied to each one of a complete set of instruments for the purpose of reducing or elevating, by alternation, the voice of the instrument on which it is placed one semitone, whereby the pitch of the entire scale is lowered a semitone, and the number for use of their favorite keys is doubled, and thus enable the players to use two instruments of three descants in the same concert-key, notwithstanding they are tuned a major third apart, and still play in some one of the favorite keys of each instrument.

I am not aware that there are any sets of instruments in use constructed according to the same relation to each other, and this feature being new and useful will enable the composer and performer to obtain twelve key-notes in the octave and still use the favorite keys of the instrument, while, by the present construction, they can command only six favorite keys in the octave. By the method now in use there are keys so highly favored that other keys of the scale are ignored. By a minor third division there are four favored keys. They are favored by having two instruments on four degrees of the scale and but one on all the remaining keys. There would be no advantage in having a set of instruments in every degree of the chromatic scale over the division by major thirds, which is the only division that divides the octave without a remainder. The combining-valve must have no greater reducing capacity than a semitone; that of a tone would lengthen the instrument too much for the right-hand valves.

I am aware that, in addition to the ordinary valves of brass instruments, the English patent of Henry shows a fourth valve or transposer, but when the transposition is made by the adjustment thereof its use ceases; it can subserve no further purpose or design; but by my application of a fourth or reducing valve to a set of instruments, which are of themselves a division of the octave by major thirds, a far more extended use is obtained and for a much more valuable purpose than can possibly be obtained without such division by major thirds. By my improved application of the fourth-valve it will combine all the pieces of a set of instruments—seven in number—and will give them correlative capacities equal to the entire chromatic scale. This is the feature which distinguishes my invention from all others in use.

By my improvement each instrument of the set is provided with said semitone valve, to be used by the left hand while playing; and the instruments of said set embrace in their pitches two octaves—thus: 1, E-flat; 2, B; 3, G; 4, E-flat, and 5, B, tenors; 6, G, and 7, E-flat, basses; or thus: 1, F; 2, D-flat; 3, A; 4, F; 5, D-flat; 6, A; 7, F; or at any other pitch that may be determined upon when a standard concert pitch is established; the pitch of the set in E-flat to correspond in size and tone with instruments now in use at E-flat. By my improvement the fourth-valves are used for reducing at will the tone of the instrument, and to reduce each instrument of the set just one semitone, as well as to be used in chromatic passages, trilling, and ornamentation.

By my improvement the valves of one instrument belong as much (or more) to the other instruments of the set of which it is one as to the instrument on which it is placed. As, for illustration, let the three descants give their written notes C (3d space, G-clef) and an unendurable discord is the result! The G sounds concert G, the B sounds B, and the E-flat sounds E-flat. The two first named being concordant require the use of the valve of the third to bring it to D, when we have the common chord of the key of G concert. Then again sound the letters C: The G sounds G, the E-flat sounds E-flat, and they, in turn, require the use of the valve of the descant in B to reduce it to B-flat, giving the common chord of E-flat, (G, B-flat.) Then again sound the letters G: The B gives B; the E-flat gives E-flat, (D-sharp,) and they together require the valve of the descant G to go down to G-flat, (F-sharp,) when we have the common chord of B, five sharps, in its second inversion. Take the letters A: The G gives E; the B gives G-sharp; but the valve of the E-flat descant must come down to B; E, G-sharp; B making the key of E. In no one key can they be played together without the use of one of the combining valves; nor can they play in any key with all their reducing-valves down. By my improvement the fourth-reducing valves of the individual instruments belong more to the other instruments of the set than they do to those on which they are placed; and the combination thereof by major thirds is a double combination, and the only combination without a hiatus. Instead, therefore, of two instruments to divide the octave I present three. These three in the octave can do all that can be done by the division by fourths, (inverted fifths;) and in addition they can render music easily upon every degree of the chromatic scale, which the division by fourths cannot do. A piece of music written in the old way can be played by my new division equally as well. The E-flat pieces can keep their own positions, and the pieces in B can take theirs in B-flat. By my improvement the set of instruments is made complete in itself.

I make no claim to the construction of valves; they may be the old pump-valve, the rotary, or the reducing may be made by slide; but my improvement relates to the application of a valve such as is now in use, to be placed on any metallic instrument, the purpose of which shall be to reduce or flatten the key-note or tone of that instrument one semitone, and to have that reducing-valve so arranged on the instrument that it can be used or played by the left hand. The sign O⎯⎯⎯⏌ is intended for the player. The O is to indicate to him at what time during the performance of a piece of music he is to put down the valve, and the straight-up mark $b$ at the end of the line is to tell him to let it go up. For example, the time being given, the player commences playing in his key of C. It is the descant in B that he is playing. He comes to a few bars under which this sign is given, and his music has a B-flat written in it. He puts down his valve and plays along as if no change had been made, without probably knowing what concert key he started in, or what key he is in at the time he put down his valve. It is indifferent to him, so that he plays his part as it is written. He is to observe this sign as piano players observe the sign for putting down the pedal or letting it up, with the difference that he must not fail to "obey orders." He started off in the key of B, (five sharps;) he put down his valve at the sign, and, finding his music with a flat written in it, he played it so, of course. At the time he put down his valve, and played as above, he was playing in the key of E-flat. It is for the musician to know this, and there is not in the entire chromatic scale any one key that can not be modulated to or from, by this combination, by major thirds and combining fourth-valves; or that cannot be played in easily by a set of instruments of my new construction. By no other division of the octave can a set of instruments be made that will do their work as completely and with so little additional expense or trouble.

Figure 2:
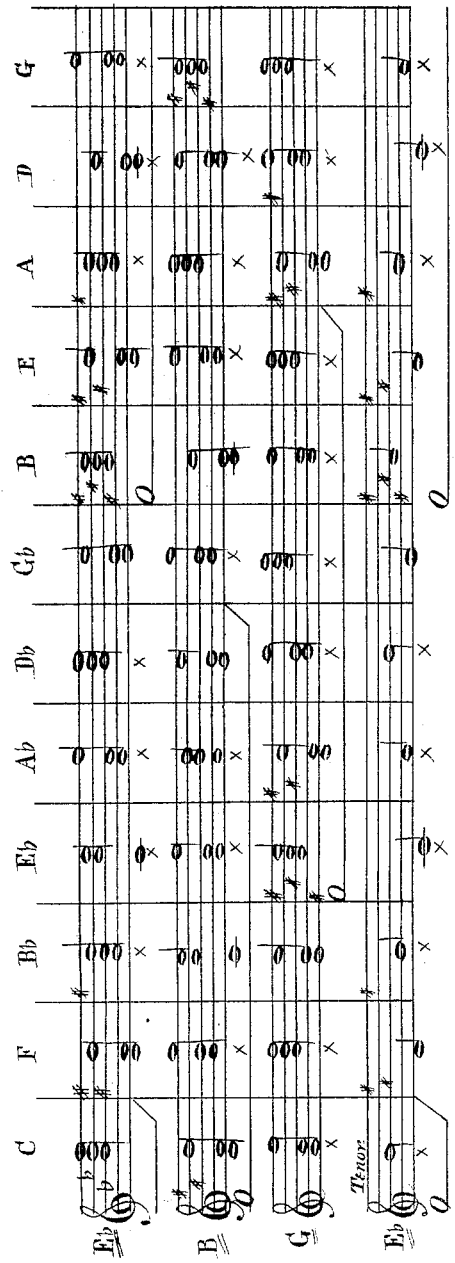

In the accompanying drawing, Fig. 1, Sheet 1, represents an elevation of one of a set of valved instruments embracing my invention. Fig. 2, Sheet 2, represents a formula, showing the keys in which the instruments dividing the octave by major thirds play in concert; and Fig. 3, Sheet 3, represents a formula for a set of instruments pitched severally in F, A, and D-flat.

In Fig. 1, $a$ represents the fourth or reducing valve placed upon the instrument, so as to be played by the left hand, and is operated according to the sign shown in Fig. 1 of the drawing, and which can be indicated upon any music now in use by any performer. Taking the formula shown in Fig. 2 as an example, it will be observed that the one in E-flat gives in "easy keys" B-flat, E-flat, A-flat, and D-flat. Reduced by valves to A D G C, B gives F-sharp, B, A, and E. Reduced by valves F to B-flat, A-flat, E-flat. G gives D, G, F, and C. Reduced by valves, gives D flat, G-flat, E, B. It will be observed that two out of the three play in these "easy keys" in every semitone of the scale.

Having thus described my invention, I claim—

A set of instruments, seven in number, pitched severally a major third apart, and each instrument of said set provided with a reducing-valve of the capacity of one semitone, as and for the purpose set forth.

ROBERT H. GATES.

Witnesses:
JOHN M. CONNELL,
I. MINS.